Dec. 27, 1938.  W. BOBRZYK  2,141,505
BEARING SYSTEM
Filed Aug. 20, 1937  2 Sheets-Sheet 1
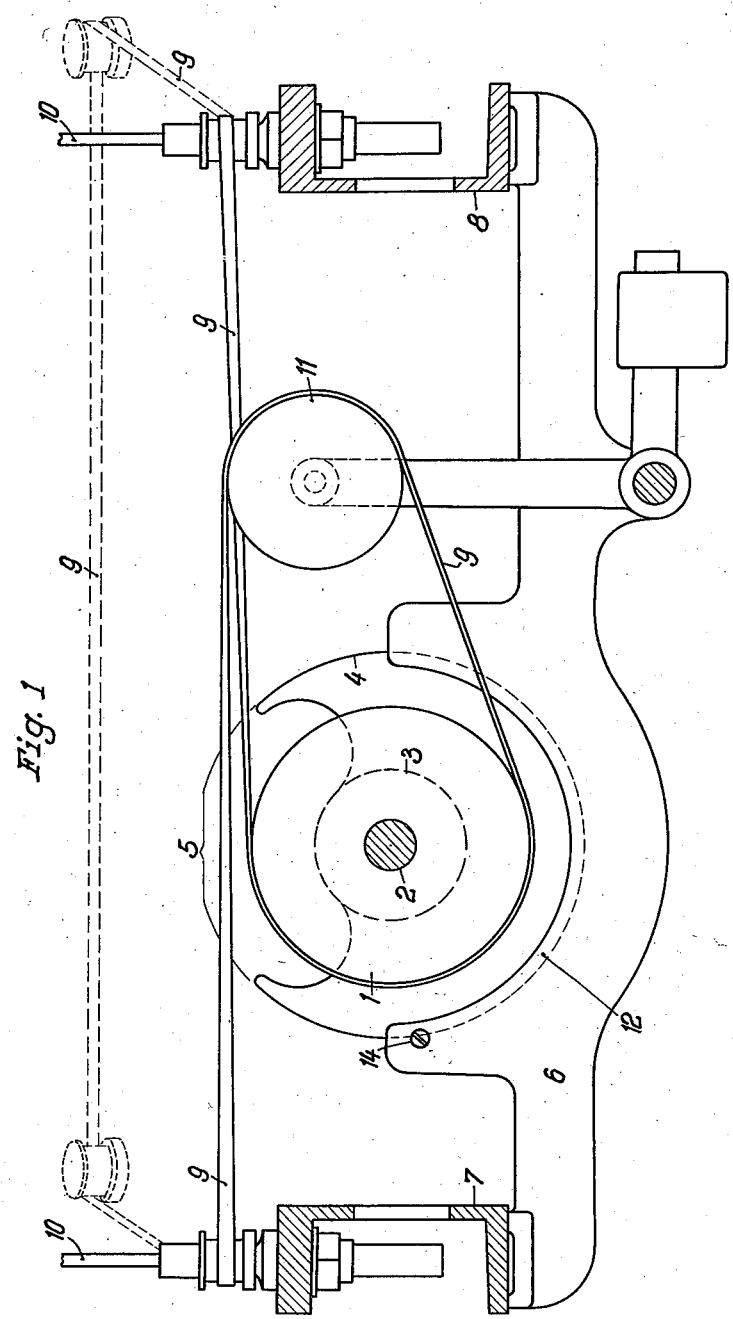
Inventor:
W. Bobrzyk
By: Glascock Downing & Seebold
Attys.

Patented Dec. 27, 1938

2,141,505

UNITED STATES PATENT OFFICE 2,141,505

BEARING SYSTEM

Wilhelm Bobrzyk, Forst, Germany

Application August 20, 1937, Serial No. 160,157
In Germany August 22, 1936

4 Claims. (Cl. 74—242.7)

The present invention relates to a system of putting-on the driving bands in belt- or rope drives, more particularly in spindle drives of spinning or twisting frames and the like.

It is the object of this invention to render it possible in spinning or other machines having shafts supported at least at two bearing points to put finished endless bands on their shaft or pulley between two bearing points in a simple manner without changing the position of the shaft and without removing any bearings, pulleys or couplings so that the bands can be joined outside the machine.

According to this invention, the endless bands or driving belts are placed into an exterior recess of a rotatably mounted bearing bushing and put on the shaft or on the tin roller by rotating the bearing bushing.

The invention will be better understood by reference to the following detailed description in connection with the accompanying drawings, showing by way of example and diagrammatically an embodiment of the invention, viz—

Figure 1 is a side view, partly in section of a spindle drive in a spinning machine, illustrating the arrangement of the rotatable bearing bushings of the tin rollers.

Figure 4:
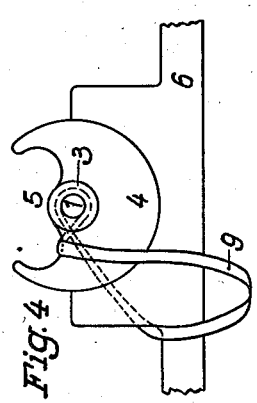
Figures 2 to 5 are schematical side views showing the rotatable bearing bushing of an end bearing, in different positions.

It is understood that the expression "spinning machines" as employed in this specification, includes twisting frames.

Figure 1 illustrates a driving arrangement in which two of four spindles 10 are driven by a common band 9 which is tensioned by means of a tension block or tightening pulley 11. Driving rollers or tin rollers 1 are rotatably mounted, by means of a shaft or journal 2, in a bearing bushing 3 having a collar or rim 4 with a recess 5. The rim 4 is rotatably mounted in the semicircular seating formed by the bearing support 6 which in this instance takes the form of a cross bar and is mounted at the two flyer frames, spindle rails or spindle bearing plates 7 and 8 but may be mounted in another manner as well. Both end faces of the rim 4 are held against axial displacement by inwardly directed flanges 12 of the bearing support 6 embracing the rim 4.

The method of putting endless spindle driving bands on the machine will be seen from Figures 2 to 10. For the sake of clarity the driving rollers or tin rollers 1 have been shown in Figures 2 to 10 in the form of shafts extending from one bearing bushing 3 to the next. It will be understood that the conditions would be the same in case of a larger diameter of the tin rollers. Moreover, for the sake of clarity, the inwardly directed flange 12 covering over the edge of the rim 4 as shown in Figure 1 has been omitted in Figures 2 to 10 in which the seating surface for the rim 4 thus becomes visible as at 13 in Figures 3 and 8. The reference numerals used in Figures 2 to 10 correspond to those of Figure 1.

The system according to this invention operates as follows:

The endless band 9 is first placed into the recess 5 of the rim 5 (Figure 2), then the rim 4 is rotated in the direction of the arrow (Figure 3) until it has reached the position shown in Figure 4. It would also be possible to rotate the rim of the end bearing in an opposite direction. The band is thus "threaded" quasi "lock-fashion" through the bearing 3, 4, 6, by means of the recess 5, and placed behind the bearing bushing 3, 4, around the roller 1, in the form of a loop. The part of the band remaining in front of the bearing bushing 3, 4 is then placed behind the bearing by hand, to adopt the position shown in Figure 5. It will be seen from these Figures 2 to 5 that the method and system according to the invention renders it possible to place the endless band 9 around the roller 1 behind the bearing 3, 4 and the cross bar 6 in spite of the obstacle formed by the bearing and the cross bar. Of course, the band 9 is now put on the remaining rollers either in a known manner by hand or if necessary by the method according to the invention.

Figure 7:
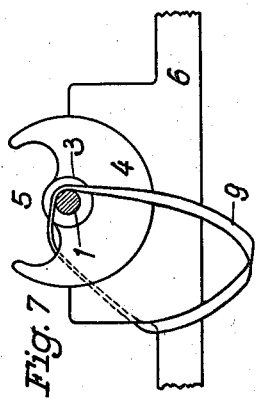
Figures 6 to 10 are schematical side views showing the rotatable bearing bushing of a bearing intermediate the end bearings, in different positions.
Figure 10:
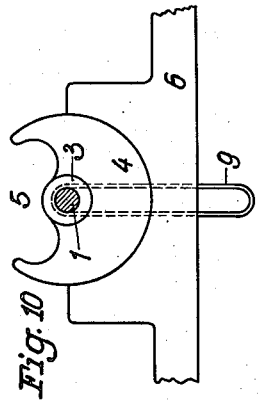
Figure 3:
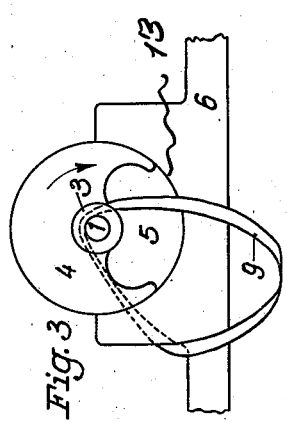
Figure 6:
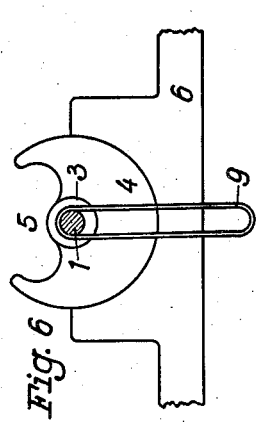
Figure 9:
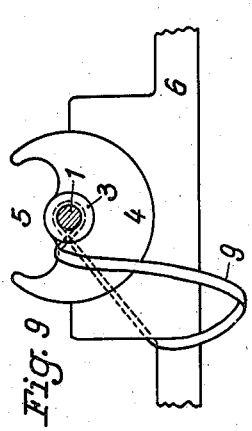
Figure 2:
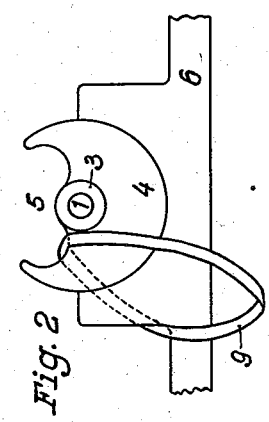
Figure 5:
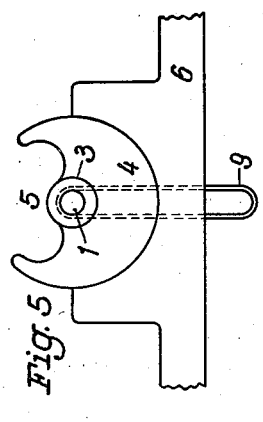
Figure 8:
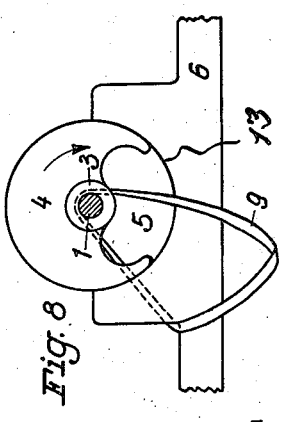

Figures 6 to 10 illustrate the method applied to a bearing of the driving roller intermediate the end bearings. The single steps of placing the band on the roller are the same as described with reference to Figures 2 to 5, so that it will not be necessary to describe the steps in detail. It will be seen that after the band 9 has been placed into the position shown in Figure 6 in the manner shown in Figures 2 to 5 and has been placed over the left hand part of the recess 5 as shown in Figure 7 the rim 4 has to be rotated in the direction indicated by the arrow in Figure 8 in order to introduce the band. On the other hand, if the band has been placed over the righthand part of the recess 5, the rim 4 has to be rotated in an opposite direction of the arrow in Figure 8 in order to introduce the band. If the rim is rotated in the wrong direction, the band would not be placed perfectly onto the next roller.

The endless bands or belts placed in this manner on the driving rollers may then be placed around the spindles and tightening pulleys in the customary manner.

After the band has been introduced through the rim 4, the bearing bushing 3, 4 may be prevented from undesirable rotation during normal working order by suitable locking means, such as worm screws 14 provided at one or several places of the flange 12 and engaging the rim 4 (Figure 1).

It will be understood that my invention may be used in connection with upright bearings as shown in the drawings or in connection with suspension-bearings, with horizontal or vertical shafts.

Also, it will be understood that the system according to the invention may be used in connection with machines with single tin roller or machines with two tin rollers, whether each band drives one spindle, two or more spindles, whether or not the band is guided over tightening pulleys or guiding pulleys and whether endless bands, belts, girths, cords, ropes, cone belts or similar endless driving means are used.

The system may be used in particular in spinning and like machines, but it may also be useful in transmission systems, belt-gearings or any other machines where belt-pulleys are located between two or more bearings and where it is intended to place endless flexible members on a rod supported at both ends.

I claim:—

1. In combination a shaft supported at least at two bearing points, a bearing bushing at one of said bearing points having a co-axial circular exterior surface and a recess extending axially over the said circular surface, a support partly surrounding, and adapted to form a seating for said circular surface, and an endless flexible member adapted to be placed around said shaft between said two bearing points by placing said endless member over said recess in the bearing bushing and rotating said bearing bushing in its seating.

2. In combination, a shaft supported at least at two bearing points, a bearing bushing at one of said bearing points having a co-axial circular exterior surface and a recess extending axially over the said circular surface, a support adapted to form a seating for said circular surface and to embrace a larger sector of said circular surface than the sector taken up by said recess and an endless flexible member adapted to be placed around said shaft between said two bearing points by placing said endless member over said recess in the bearing bushing and rotating said bearing bushing in its seating.

3. In combination, a shaft supported at least at two bearing points, a bearing bushing at one of said bearing points having a co-axial circular exterior surface and a recess extending axially over the said circular surface, a support adapted to partly surround, and to form a seating for, said cylindrical surface and to prevent said bushing from axial displacement by inwardly directed flanges extending partly over the axial end faces of said bearing bushing and an endless flexible member adapted to be placed around said shaft between said two bearing points by placing said endless member over said recess in the bearing bushing and rotating said bearing bushing in its seating.

4. In an arrangement according to claim 1, including adjustable means for preventing said bearing bushing from rotating when the system is in its normal working condition.

WILHELM BOBRZYK.